US009425885B2

(12) United States Patent
Ben Slimane et al.

(10) Patent No.: US 9,425,885 B2
(45) Date of Patent: Aug. 23, 2016

(54) NETWORK CODED DATA COMMUNICATION

(75) Inventors: Slimane Ben Slimane, Saltsjobo (SE); Jawad Manssour, Stockholm (SE); Afif Osseiran, Kista (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 465 days.

(21) Appl. No.: 12/937,034

(22) PCT Filed: Apr. 11, 2008

(86) PCT No.: PCT/SE2008/050413
§ 371 (c)(1),
(2), (4) Date: Oct. 8, 2010

(87) PCT Pub. No.: WO2009/126079
PCT Pub. Date: Oct. 15, 2009

(65) Prior Publication Data
US 2011/0026429 A1    Feb. 3, 2011

(51) Int. Cl.
*H04L 12/26* (2006.01)
*H04B 7/14* (2006.01)
*H04W 4/00* (2009.01)
*H04B 7/155* (2006.01)
*H04L 1/00* (2006.01)

(52) U.S. Cl.
CPC .......... *H04B 7/15521* (2013.01); *H04L 1/0001* (2013.01); *H04L 1/0026* (2013.01); *H04L 2001/0097* (2013.01)

(58) Field of Classification Search
CPC  H04B 7/15521; H04L 1/0001; H04L 1/0026; H04L 2001/0097
USPC ......... 370/216–253, 279, 313, 315, 327–334, 370/338, 340, 341; 455/422.1, 435.3
See application file for complete search history.

(56) References Cited

U.S. PATENT DOCUMENTS

| 7,706,365 B2 * | 4/2010 | Effros et al. ................... 370/389 |
| 2009/0180410 A1 * | 7/2009 | Lee et al. ....................... 370/294 |
| 2009/0201899 A1 * | 8/2009 | Liu et al. ........................ 370/338 |
| 2010/0278096 A1 * | 11/2010 | Wang et al. ................... 370/315 |

OTHER PUBLICATIONS

Cong Peng; Qian Zhang; Ming Zhao; Yan Yao, "SNCC: A Selective Network-Coded Cooperation Scheme in Wireless Networks," Communications, 2007. ICC '07. IEEE International Conference on, vol., No., pp. 4219-4224, Jun. 24-28, 2007.*

(Continued)

*Primary Examiner* — Andrew Lai
*Assistant Examiner* — Albert Shih
(74) *Attorney, Agent, or Firm* — Patent Portfolio Builders, PLLC

(57) ABSTRACT

A data communication involves selecting a group (15) of M multiple source nodes (12, 16) among N multiple source nodes (10, 12, 14, 16) present in a communication system (1) and having data destined for a destination node (30), where $2 \leq M < N$. A relay node (20) network codes data from the selected group (15) of M nodes (12, 16) to form combined, network coded data. This resulting data is sent to towards the destination node (30). The purposeful selection of source nodes (10, 12, 14, 16) in connection with network coding substantially increases the throughput of the communication system (1).

15 Claims, 7 Drawing Sheets

(56) References Cited

OTHER PUBLICATIONS

Bao, X. et al. "Adaptive Network Coded Cooperation (ANCC) for Wireless Relay Networks: Matching Code-on-Graph with Network-on-Graph." IEEE Transactions on Wireless Communications, vol. 7, No. 2, Feb. 2008, pp. 574-583.

Li, G. et al. "Resource Allocation for OFDMA Relay Networks." Conference Record of the 38th Asilomar Conference on Signals, Systems and Computers, vol. 1, Nov. 7-10, 2004, pp. 1203-1207.

Puducheri, S. et al. "The Design and Performance of Distributed LT Codes." IEEE Transactions on Information Theory, vol. 53, No. 10, Oct. 2007, pp. 3740-3754.

Peng, C. et al. "SNCC: A Selective Network-Coded Cooperation Scheme in Wireless Networks." IEEE International Conference on Communications, 2007 (ICC '07), Jun. 24-28, 2008, pp. 4219-4224.

Kaya, O. et al. "Power Control for Fading Cooperative Multiple Access Channels." IEEE Transactions on Wireless Communications, vol. 6, No. 8, Aug. 2007, pp. 2915-2923.

\* cited by examiner

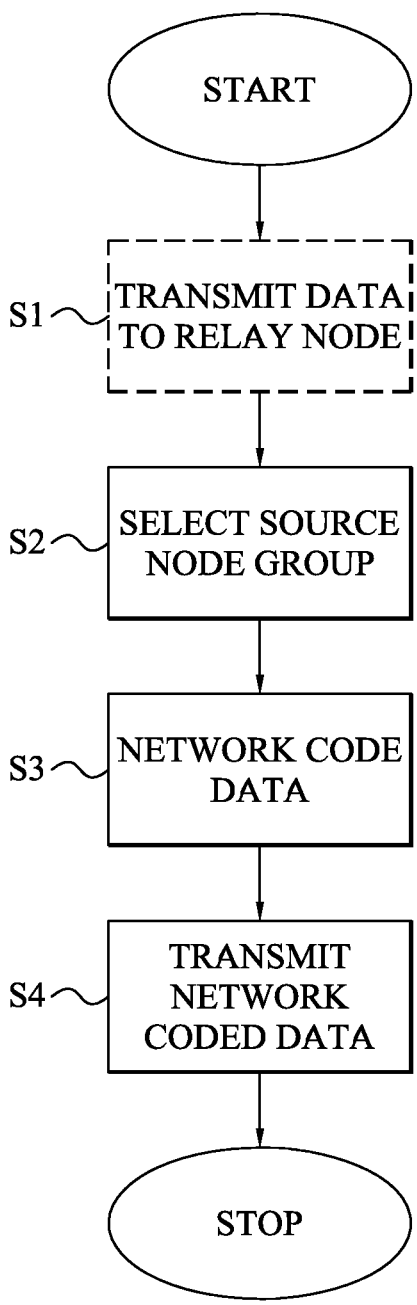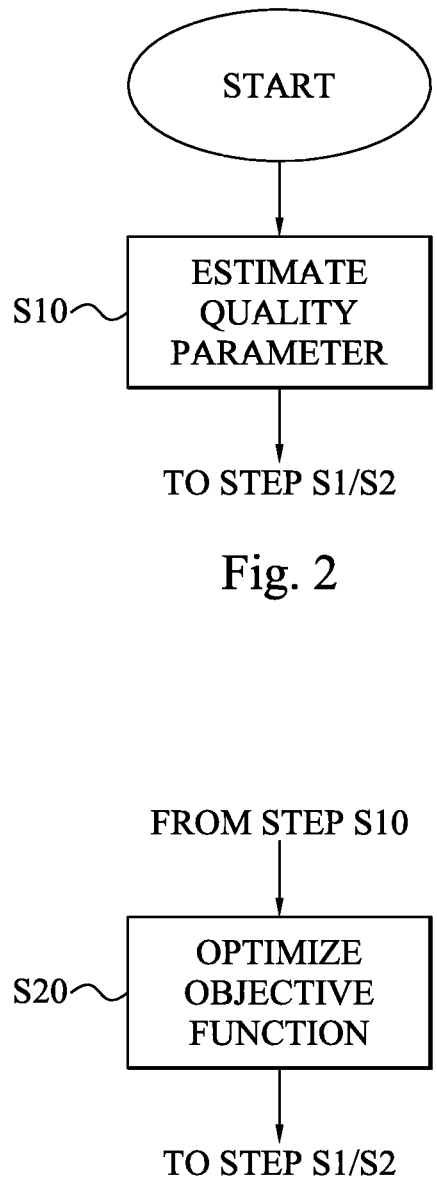
Fig. 1
Fig. 2
Fig. 3

NETWORK CODED DATA COMMUNICATION

TECHNICAL FIELD

The present invention generally relates to data communication in a communication system, and in particular to network coded data communication.

BACKGROUND

A main striving force in the development of wireless and cellular communication networks and systems is to provide, apart from many other aspects, increased coverage or support of higher data rate, or a combination of both. Further, the cost aspect of building and maintaining the system has been of great importance and is expected to become even more so in the future. Until recently the main topology of wireless communication systems has been fairly unchanged, including the three existing generations of cellular networks. The topology of existing wireless communication systems is characterized by the cellular architecture with the fixed radio base stations and the mobile stations as the only transmitting and receiving entities in the networks typically involved in a communication session.

One way to introduce macro-diversity is to use relaying or distributed systems, such as distributed antenna systems or cooperative systems. A relaying system is a conventional radio network that is complemented with relay nodes. The relay nodes communicate wirelessly with other network elements, e.g. base station, another relay or a user terminal. A cooperative relaying system is a relaying system where the information sent to an intended destination is conveyed through various routes and combined at the destination. Each route can consist of one or more hops utilizing the relay nodes. In addition, the destination may receive the direct signal from the source.

The present-day communication networks, mentioned above, share the same fundamental principle of operation: the information or packet sent from one source to a destination is transported independently from other information sent from another source to the same destination. Routers, repeaters or relays simply forward the data to the destination. In contrast to those communication networks, network coding is a new area of networking and data communication, in which data is manipulated inside the network to improve throughput, delay, and robustness. In particular, network coding allows instead the nodes to recombine several input packets into one or several output packets. At the network coding node some linear coding could be performed on the packets present at the network coding node, and the resulting encoded packet can be broadcasted for different recipients simultaneously instead of transmitting each packet separately.

WO 2007/008123, WO 2007/008162 and WO 2007/008163 disclose the usage of network coding in connection with a communication system utilizing automatic repeat request (ARQ) and/or multihop scheduling and forwarding. The network coding is based on the capability of receiving nodes to overhear data transmissions from a sending node and destined for other receiving nodes. The information of the overheard data is sent to a network coding node. The network coding node uses the information when selecting the data packets to combine by network coding and when deciding to which receiving nodes such a combined data packet should be sent.

The above-mentioned documents provide an improvement to data communication in ARQ-based and multihop networks. However, there is still a need to further improve data communication in connection with network coding.

SUMMARY

The present invention overcomes these and other drawbacks of the prior art arrangements.

It is a general object of the present invention to provide a network coding based data communication.

It is another object of the invention to provide an efficient data communication in a communication system.

These and other objects are met by the invention as defined by the accompanying patent claims.

Briefly, the present invention involves data communication in a communication system, and in particular such data communication involving network coding of data. The communication system of the invention comprises N multiple source nodes, such as user terminals, having data destined for a destination node, such as a base station or another network node of the communication system. The invention involves selecting a subset of these N source nodes and utilizing the data of the carefully selected source nodes in the network coding. As a consequence, a group of M multiple source nodes is selected among the N source nodes. Furthermore, this number M is equal to or larger than two but is smaller than the number N. The data from the selected M source nodes are network coded by a relay node of the communication system to form combined, network coded data. This coded data is then transmitted by the relay node towards the destination node, where decoding occurs.

The purposeful source node selection of the present invention is preferably performed based on respective communication quality parameters associated with the N source nodes. A preferred such communication quality parameter is the link quality for the communication links between the source nodes and the relay node and/or the destination node.

A preferred implementation performs the source node selection based on optimization of a cost or objective function. In such a case, the function input can be communication quality parameters and the set of source nodes that optimizes the objective function is selected. Information of the selected source nodes is employed by the relay node for providing the correct data and network encode it into the combined data destined for the destination node.

The invention also relates to a network coding control system comprising an identifier provider for providing identifiers of the N multiple source nodes. A source selector of the control system selects the group of M source nodes among the N nodes, preferably based on at least N communication quality parameters and more preferably based on the optimization of an objective function. An identifier forwarder of the control system forwards the identifiers of the selected group of M source nodes to the relay node network, which codes, using the selected M identifiers, data from the M source nodes to form network coded data to be transmitted to the destination node.

The purposeful selection of source nodes of the present invention in connection with network coding and data communication significantly improves the system throughput by better exploiting fluctuations and variations in the communication qualities for the different source nodes in the communication system. Furthermore, the outage probability of the communication system becomes reduced, thereby effectively leading to a more efficient data communication.

Other advantages offered by the present invention will be appreciated upon reading of the below description of the embodiments of the invention.

SHORT DESCRIPTION OF THE DRAWINGS

The invention together with further objects and advantages thereof, may best be understood by making reference to the following description taken together with the accompanying drawings, in which:

FIG. 1 is a flow diagram illustrating a data communication method according to an embodiment of the present invention;

FIG. 2 is a flow diagram illustrating an additional step of the data communication method of FIG. 1;

FIG. 3 is a flow diagram illustrating an additional step of the data communication method of FIG. 2;

Figure 6A:
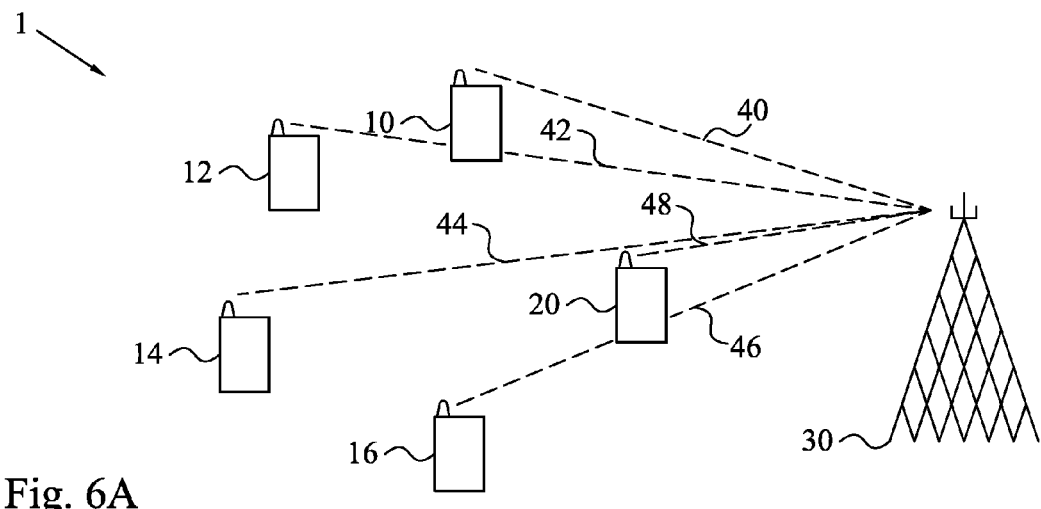
Figure 6B:
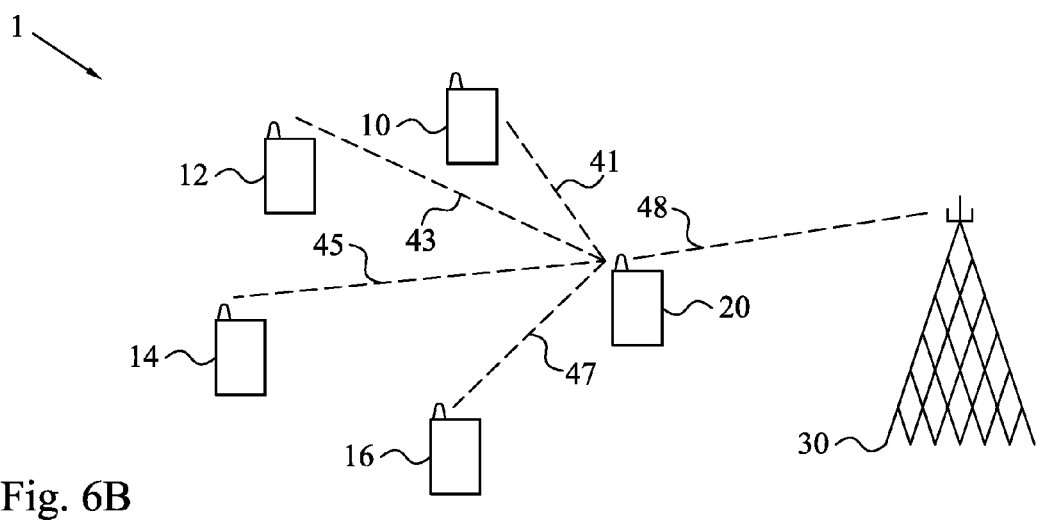
Figure 6C:
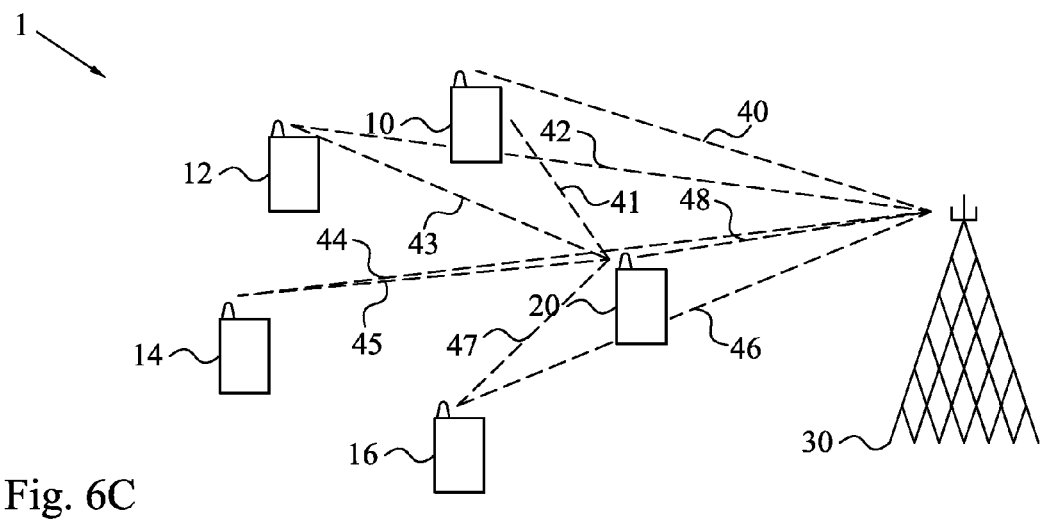
Figure 7:
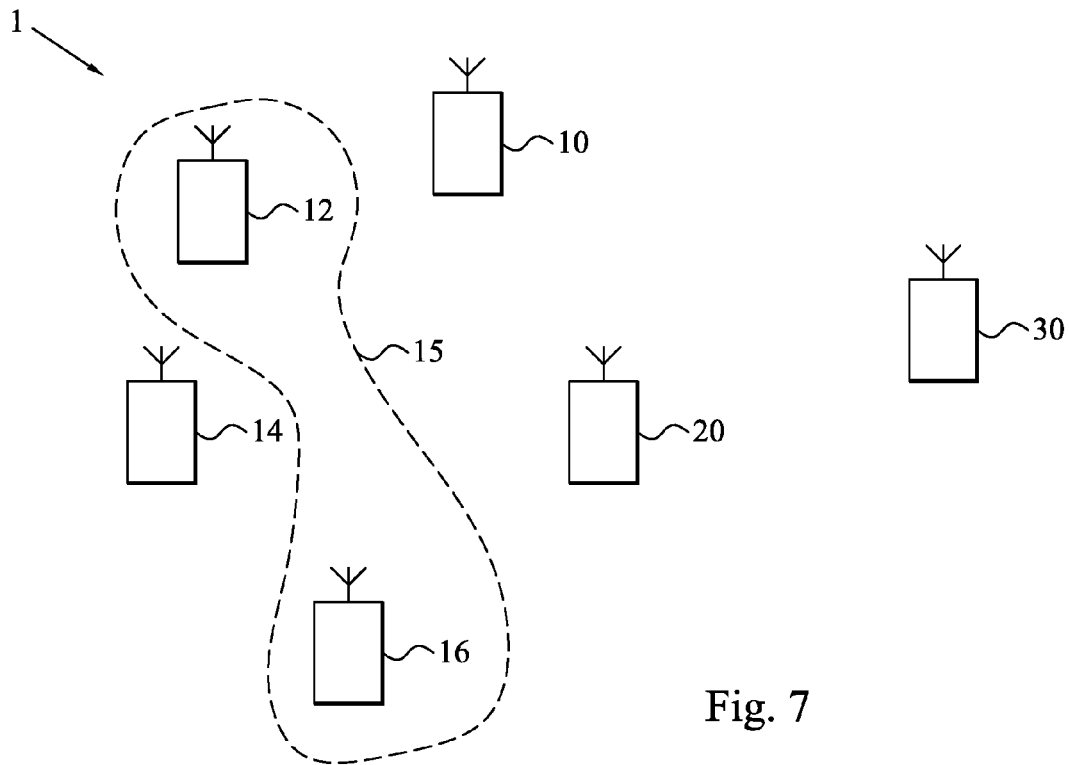
Figure 8:
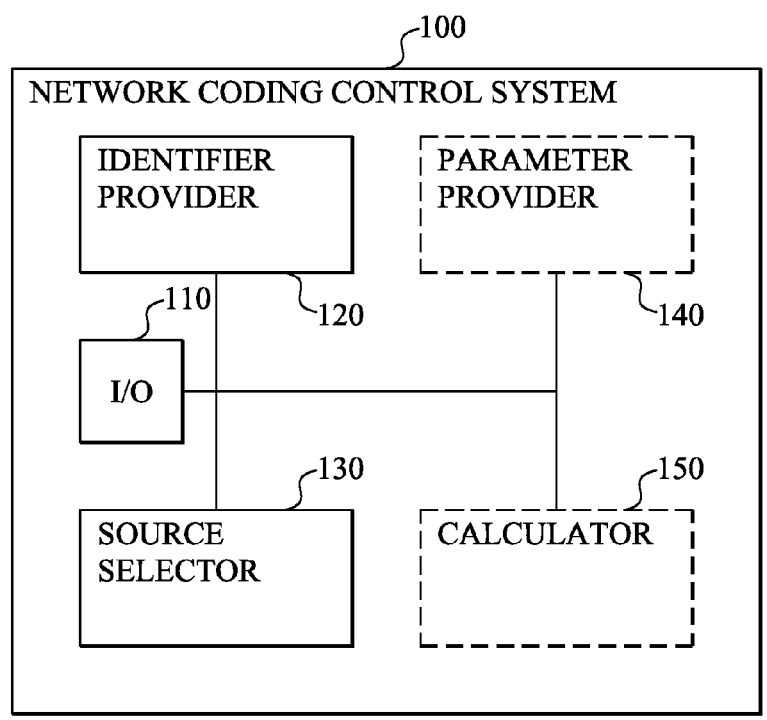
Figure 10:
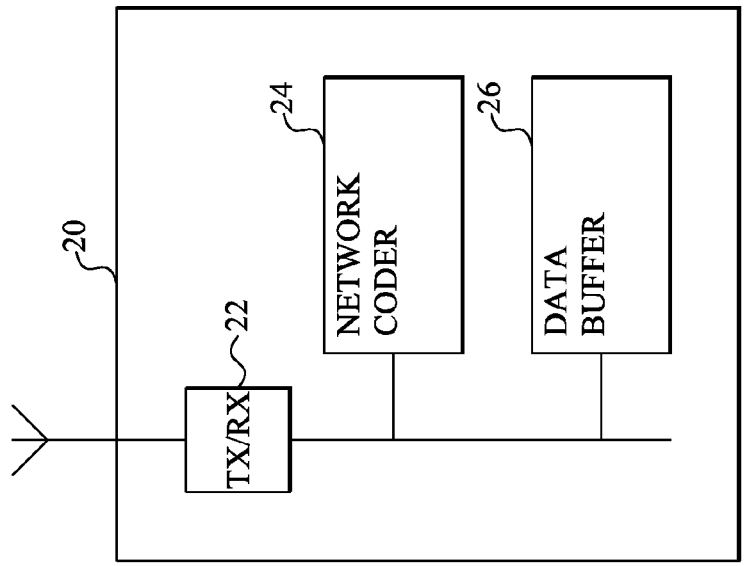
Figure 9:
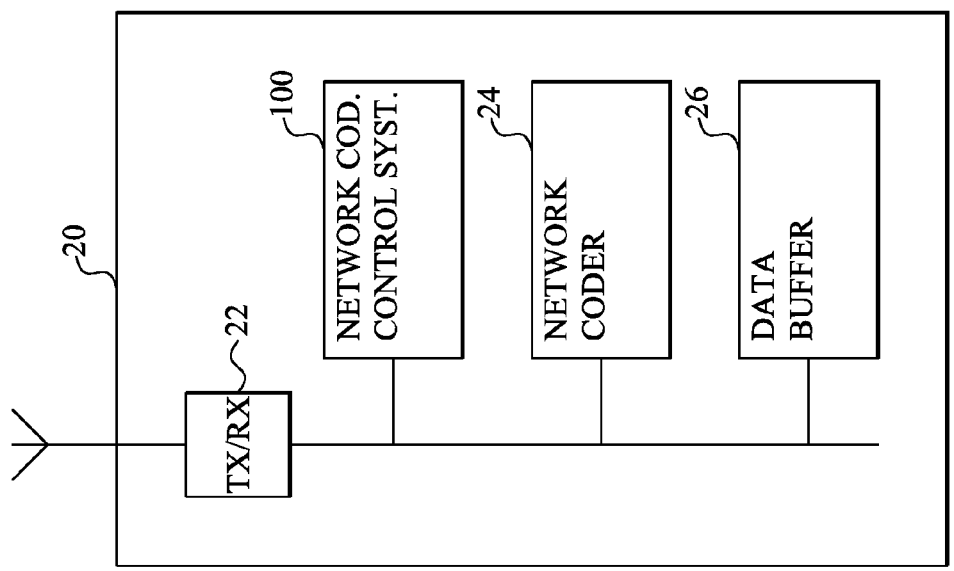
Figure 11:
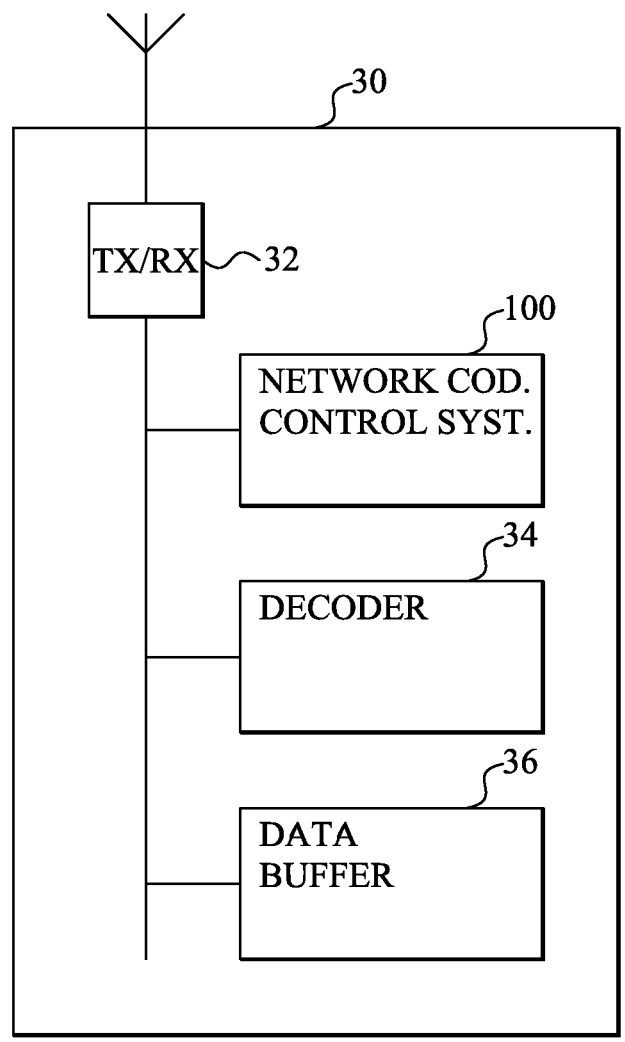

FIGS. 6A to 6C schematically illustrate usage of link qualities from different communication links according to different embodiments of the invention;

FIG. 7 is a schematic overview of a portion of another communication system, in which the present invention can be implemented;

FIG. 8 is a schematic block diagram of a network coding control system according to an embodiment of the present invention;

FIG. 9 is a schematic block diagram of a relay node according to an embodiment of the present invention;

FIG. 10 is a schematic block diagram of a relay node according to another embodiment of the present invention; and FIG. 11 is a schematic block diagram of a destination node according to an embodiment of the present invention.

DETAILED DESCRIPTION

Throughout the drawings, the same reference characters will be used for corresponding or similar elements.

The present invention generally relates to data communication in a communication system or network, and in particular such communication involving network coding. Network coding is a new technique that in essence involves jointly coding different information flows together in the network. By this data combination at a network node and the following transmission of the resulting combined data, throughput, delay and robustness of the communication system can be improved. Traditional network coding is applied to a situation involving two transmitting nodes forwarding data to a network encoding node that performs the combination of the received data. The network coded data is then forwarded, such as multicast or broadcast, by the network node to one or more intended receiving nodes.

The present invention in clear contrast is directed towards a selective and purposeful grouping of the transmitting nodes in connection with network coding. This means that the transmitting nodes are dynamically grouped together to form a basis for the data network coding. This dynamic grouping takes advantage of fluctuations and changes in the radio conditions of the system to thereby dynamically update the node grouping in an optimal way adapted to the current conditions. This will further significantly improve the system throughput and capacity even further as compared to a traditional fixed-grouping network coding.

FIG. 1 is a flow diagram illustrating an embodiment of the data communication method of the present invention. This communication method is implementable in a communication system or network comprising N multiple source or transmitting nodes. These N nodes each has data destined for a destination or receiving node in the system. Thus, all of these source nodes contain data that they would need to transmit to the destination node through the communication system.

The method starts in the optional step S1, where data from at least a group of M multiple source nodes of the N nodes transmit their respective destination-intended data to a relay node of the communication system. This relay node therefore constitutes a cooperative relaying unit that forwards data received from a source node towards an intended destination. This forwarding can be a direct transmission of the data from the relaying node to the destination node or a transmission involving multiple hops, i.e. at least one further relay node, in the transmission path from the relay node to the destination node.

According to the present invention, a next step S2 selects a group of M multiple source nodes among the N source nodes. In this case 2≤M<N, in other words a subset of the N source nodes is selected in step S2 to form a M-node group of at least two source nodes. This selection of step S2 is not a random selection but a purposeful and dynamic selection that is preferably performed based on one or more communication quality parameters as is further described herein. Step S2 therefore involves identifying a subset of those N nodes that all contain data to be transmitted to one and the same destination node.

The relay node network encodes, in step S3, data from the selected group of M source nodes to fog in combined or network coded data. As a consequence, the group selection of step S2 decides what data to combine in the relay-based network coding. This is in clear contrast to prior art techniques, such as illustrated by the previously three cited International patent applications. They disclose that the data to combine in the form of network coding is based on what data multiple destination or receiving nodes have already received. The documents therefore exploit data overhearing to reduce the amount of data that has to be transmitted through the system and thereby can obtain a throughput increase. The present invention teaches an alternative throughput increasing technique that can be used separate from or as a complement to the prior art solution. Thus, the dynamic selection of source node subset of the invention allows exploitations in differing quality parameters for the N source nodes to thereby take advantage of such fluctuations and changes in the dynamic node selection.

The data network coding of step S3 can be performed according to so-called digital network coding or analog network coding. Analog network coding refers to data coding at the signal level. This means that analog network coding lets the analog signals add up through simultaneous transmissions, i.e. by letting two signals interfere with each other intentionally. With the coding, i.e. signal addition, occurring at the relay node, then based on the relay type different approaches are possible, such as decode and forward (relay node demodulates and decodes the signal prior to re-encoding and retransmission) or amplify and forward (the relay node simply amplifies and forwards the received signals). In short, an analog network coding scheme may consist of two transmission slots. During the first time slot, the M source nodes transmit data on the same band. During the second slot, the relay node forwards the interfering signals to the destination node. Therefore, the trade-off is between the number of transmissions and the generated interference.

In clear contrast, digital network coding refers to coding at the packet level, meaning that the network coding node will perform an encoding on the bits of the data packets received from the M source nodes. In order to do so, the network coding node needs to possess decoding capabilities, hence digital network coding can be performed with decode and forward relays. Digital network coding generally tries to avoid interference between the source nodes encoded together. Consequently, digital network coding schemes typically require more transmission slots than analog network coding to deliver information. Thus, during the first slot, i.e. first phase, one of the source nodes transmits its data packet. In a second slot, a second source node transmits its packet to the relay node and so on until all M nodes have sent their data packets. During the next time phase, the network coding node forwards the network coded packet in a slot. In fine, digital network coding requires only M+1 transmissions in contrast to a classical relaying system where 2M transmissions are required.

The digital network coding that can be used according to the present invention is preferably a linear data combining. Examples of such linear methods include summation over a predetermined b-bit Galois field, such as bitwise XOR-operations, and modulus-operations.

XOR bitwise encoding is a very suitable encoding method because of its simplicity. Other codes may also be used, such as an erasure code like Reed Solomon. With respect to the Reed Solomon type of coding, the same operation as the XOR operation between two data words is for instance possible if one selects a shortened RS code with k=2 and with n=3 codewords. The non-systematic codeword n−k=1 is resent instead of the two bitwise XORed words. Other erasure codes or erasure code oriented encodings may instead be used in the network coding.

Instead of operating on single bits, segments of b bits may be used for the network encoding. A Galois field of $2^b$ may then be used, under which addition is the encoding operation. With this notation, the XOR operation is just an addition in the Galois field of $2^1$.

A further example of an encoding operation suitable to use in the network encoding is based on the modulus operation. Per signal constellation symbol encoding is considered in the following, and the procedure can be repeated for multiple consecutive constellation symbols. The modulus operation is in this example performed both for the real and imaginary part independently when handling complex numbers and utilize a definition of the modulus operation and the mathematical observation that:

$$((A+B) \bmod L - B) \bmod L = (A) \bmod L$$

Thus, a real valued signal B can be superimposed on a real valued signal A and allow undisturbed recovery of the signal A (as long as the signal A does not exceed the quantization level L), while the amplitude and hence the power is limited of the (non-linearly encoded) composite (network coded) signal.

With reference anew to FIG. 1, the data transmission of step S1 in which data from at least the M source nodes selected in step S2 is transmitted to the relay node can of course involve that data from the remaining N−M nodes is also sent to the relay node. Furthermore, the data transmission of step S1 can be performed before the node selection of step S2 as illustrated in the figure. In alternative embodiments, the data transmission is performed in parallel with or following the node selection in step S2. It is also anticipated by the invention that some of the M source nodes may transmit data to the relay node before the node group selection, some of M nodes may transmit data during the selection and some may forward data to the relay node following the selection of step S2.

The network coded data generated in step S3, for instance based on any of the above-discussed methods, is transmitted to or towards (in one or more hops) to the destination node in step S4. The destination node then processes, i.e. decode, the combined data to obtain the individual data packets and information from the M source nodes.

The data retrieval and decoding is preferably based on data that the destination node previously has received or will later receive from a subset of the M source nodes. In general, if the composite network coded data contains data from M sources, the destination node need to have access to (individual) data from M−1 of the M source nodes. For instance, assume that M=3 and the destination node previously has received a data packet $b_1$ from a first source node, either directly from the node or through the relay node. In this example, the relay node performs a digital network coding of the data packets $b_1$, $b_2$, $b_3$ from the three selected source nodes to get a combined packet $b_1 \oplus b_2 \oplus b_3$ ($\oplus$ corresponds to an XOR operation). In such a case, the destination node can use the previously received data packet $b_1$ for partly decoding the network coded packet and obtain a partly decoded packet $b_1 \oplus (b_1 \oplus b_2 \oplus b_3) = b_2 \oplus b_3$. The destination node then has to await one of the remaining data packets $b_2$ or $b_3$ in order to obtain decoded versions of all three packets. This awaiting can alternatively be replaced by a direct request from the destination node of one of the remaining packets from the relevant source node.

The method then ends.

FIG. 2 is a flow diagram of a preferred additional step of the data communication method of the present invention. The step S10 involves providing or estimating a respective communication quality parameter associated with preferably each of the N source nodes. In other words, step S10 preferably involves estimating quality parameters representative of a respective communication quality associated with the source nodes. The estimation of step S10 is preferably performed for each of the N source nodes, giving at total of at least N quality parameters. However, the present invention can also be employed in connection with obtaining quality parameters for a subset of the N source nodes, in which fewer than N quality parameters are available.

Different such quality parameters that are measurable or can at least be estimated by the source nodes, the relay node, the destination node or another network node of the communication system can be used according to the present invention. Examples of such quality parameters include delay parameters and data rate parameters. Thus, a delay parameter can be representative of the communication delay occurring from the transmission time at the source node up to the reception time at the relay or destination node of the sent data. A data rate parameter is reflective of the current data rate, such as bit-rate, achievable on the communication link between the source node and the relay or destination node.

A preferred quality parameter that is particularly useful according to the present invention, optionally in combination with other parameters, such as delay and/or data rate parameters, is a link quality parameter. In such a case, such link quality parameters are estimated in step S10 for the N source nodes. Signal to interference and noise ratio (SINR) and signal to noise ratio (SNR) include two examples of a link quality parameter that can advantageously be used according the present invention.

With reference to FIG. 6A, a communication system 1 comprising N=4 source nodes 10, 12, 14, 16, a relay node 20 and a destination node 30 is schematically illustrated. Each source node 10, 12, 14, 16 has in this example a communication link or channel 40, 42, 44, 46 established with the destination node 30. At least some of these links 40, 42, 44, 46 may currently experience very low SINR or SNR so that a relay node 20 is instead employed for helping in the transmission of data from the low quality experiencing node 16 to the destination node 30. In such a case, the link quality parameters employed according to the present invention and estimated in step S10 can be respective link parameters representative of the current quality of the communications link 40, 42, 44, 46 between the sources 10, 12, 14, 16 and the destination 30. As is illustrated in the figure, a corresponding quality parameter representative of the link quality for a communication link 48 between the relay node 20 and the destination 30 can advantageously also be estimated and used in the invention.

In this case, the quality parameters can be estimated by the individual source nodes 10, 12, 14, 16 and the relay node 20. The quality estimates are then reported to the network node that performs the source selection according to the present invention, such as the destination node 30 (to be described further herein). Alternatively, or in addition, the quality estimation can be conducted by the destination node 30 having links with all the sources 10, 12, 14, 16 and the relay 20.

FIG. 6B illustrates an alternative approach. In clear contrast to FIG. 6A, quality parameters representative of the dynamic quality of communication links 41, 43, 45, 47 between the source nodes 10, 12, 14, 16 and the relay node 20 are estimated in step S10 of FIG. 2. Also the relay-destination link quality can be used together with the N source-relay quality parameters.

The parameter estimation is advantageously performed by the relay node 20 or can be performed by the source nodes 10, 12, 14, 16. The quality estimates are then reported to the node selecting node, such as the relay node 20.

FIG. 6C is basically a combination of the situations illustrated in FIGS. 6A and 6B. This embodiment provides a more complete picture of the current link quality situation in the system 1. This means that for each source node 10, 12, 14, 16 two quality parameters are preferably estimated; one representative of the quality for the source-destination link 40, 42, 44, 46 and one indicative of the quality of the source-relay link 41, 43, 45, 47. These in total 2N link qualities are advantageously complemented with the quality parameter for the relay-destination link 48.

The different communication nodes involved in the present invention traditionally has equipment for performing regular, intermittent or upon request quality measurements with those network nodes to which the nodes can communicate. In order to have as a dynamic and representative source selection as possible, a most recent such quality parameter estimate is preferably used for each relevant communication link according to the present invention. Alternatively, multiple most recent parameter estimates, such as in the form of an average link quality, could be employed.

The data communication method of the present invention continues from step S10 of FIG. 2 to step S1 or S2 of FIG. 1 (depending on whether source-to-relay transmission occurs before, during or after node selection). The selection of the group of M source nodes among the N source nodes in step S2 is then performed based on at least a portion, preferably all, quality parameters estimated in step S10 of FIG. 2. In such a case, the purposeful source node group selection of the invention is made dependent on the estimated communication quality parameters and preferably based on the respective source-destination and/or source-relay link quality parameters.

A quality-based selection of the source subset of the present invention can take advantage of and exploit fluctuations and variations in the experienced communication qualities, in particular link qualities, for the different source nodes over time. This means that at a given time and based on the quality parameters at that time, a first "optimal" source node group will be selected. However, at another time the communication qualities for the individual source nodes have changed, implying that a second, different "optimal" source node is instead selected based on the newly estimated quality parameters. This provides dynamicity to the source node group selection of the present invention.

In a particular embodiment of the present invention, the plural number M could be predefined and fixed. In such a case, the selection and preferably parameter-based selection of the present invention comprises selecting which particular source nodes among the N nodes that should be grouped and handled together in the network coding. As a consequence, M nodes are selected from $S_1$, $S_2$, K, $S_N$, where $S_i$, i=1K N denotes a source node. A preferred implementation of this embodiment is to have a fixed M number of M=2. This means that a pair of source nodes is selected in step S2 of FIG. 1.

An alternative embodiment of the present invention, first selects or determines the plural number M, where M is equal to or larger than two but smaller than the total number N of source nodes having data destined for the same destination node. The number selection is preferably based on the estimated quality parameters but can also or instead be performed based on other selection parameters. For instance, the a priori information mentioned in the three International patent applications, i.e. information of the data packets from the source node that the destination node already has received could be used in the selection of M.

Once the number M has been selected in step S2 of FIG. 1, the M particular nodes to include in the node group are selected, preferably based on the estimated quality parameters, among the N available source nodes.

In an embodiment, the grouping of source nodes according to the present invention is performed based on optimization or an objective or cost function. This embodiment is illustrated in the flow diagram of FIG. 3. The method continues from the parameter estimating step S10 of FIG. 2. A next step S20 formulates and optimizes an objective or cost function in order to select an optimal source node group. Let $J(p_1, p_2, K, p_K)$ be the objective function, which depends on some quality parameter $\{p_i\}$, i=1K K, where preferably K≥N though the invention can also be implemented with fewer input parameters than the number of source nodes, i.e. K<N. Let G be the set of all possible source node groups. In such a case, the group selection of the present invention aims at determining the best or optimal source node group that satisfies $J(G)$:

$$G^* = \underset{\overline{G} \in G}{\operatorname{argmax}} J(\overline{G}) \qquad (1)$$

where G* is the source node group of M nodes satisfying the optimization criterion.

The present invention can be used in connection with multiple different objective functions in order to optimize or achieve different system target goals. An optimization criterion could therefore be the minimization of transmission delays in the communication system. Another example is the maximization of the data rates for the source nodes in the system. Further examples include minimization of outage probability, maximization of the system capacity and avoidance or minimization of interference.

The realization of the present invention is illustrated below with a particular implementation example using digital network coding and maximization of the sum capacity of the communication system.

Let $T=\{S_1, S_2, K, S_N\}$ be the set of all active source nodes having data destined for a destination node in the communication system. In this illustrative implementation example, M=2, i.e. a pair of source nodes is selected based on optimization of the objective function. Let $$G = \{G_1, G_2, K, G_{\sum_{i=1}^{N-1} i}\}$$

be the set of all possible combinations of grouping two distinct source nodes belong to the set T. Let $$G(m, n) = G_{\sum_{i=1}^{m-1}(N-i)+n-m} = \{S_m, S_n\}$$

denote one of the possible node pairs, i.e. $G(m,n) \in G$ and $n>m$.

Let $\Gamma_m$, $\Gamma_n$ and $\Gamma_R$ be the SINR at the destination node of the source nodes $S_m$, $S_n$ and the relay node R, respectively. Further, assume that the source node with the highest SINR is decoded first and followed by decoding the XORed signal received from the relay node. Then the sum capacity is given by $$C(G(m,n)) = C_m + C_n \quad (2)$$

$$C(G(m,n)) = \log(1+\max(\Gamma_m,\Gamma_n)) + \log(1+\Gamma_R+\min(\Gamma_m, \Gamma_n)) \quad (3)$$

where $C_m$ and $C_n$ is the capacity of source node $S_m$ and $S_n$, respectively.

The proposed example optimization criterion is to maximize the sum capacity, i.e. select the source node pair G that maximizes the capacity:

$$G^* = \operatorname{argmax} C(G(m, n)) \quad (4)$$
$$G(m, n) \in G$$

The optimal node pair that maximizes the sum capacity of the communication system can be selected based on an exhaustive search among the $$\sum_{i=1}^{N-1} i$$

different unique pairs of source nodes. However, also non-exhaustive methods can be employed by, in advance, omit one or more node pairs that are regarded as highly unlikely to optimize the objective function. In the above example, such an omission can be performed by first investigating the individual SINR parameters for the source nodes. If any node has an associated SINR that is below a predefined threshold $T_{SINR}$, that node is omitted from the search. This will then reduce the complexity of the optimization algorithm by disregarding less likely optimal node groups.

In the following, a simple example is presented in order to quantify the gain obtainable by employing the present invention. Let $T=\{S_1, S_2, S_3, S_4\}$ be the set of active source nodes in the communication system and G be the set of all the possible pair of source node groups (M=2). In such a case, G contains $$\sum_{i=1}^{4-1} i = 1+2+3 = 6$$

different source node pairs $G=\{G_1, G_2, G_3, G_4, G_5, G_6\}$, where $G_1=\{S_1, S_2\}$, $G_2=\{S_1, S_3\}$, $G_3=\{S_1, S_4\}$, $G_4=\{S_2, S_3\}$, $G_5=\{S_2, S_4\}$ and $G_6=\{S_3, S_4\}$. Let $\Gamma_1=-10$, $\Gamma_2=5$, $\Gamma_3=-5$ and $\Gamma_4=15$, where $\Gamma_i$ is the SINR in dB of the $i^{th}$ source node $S_i$. Assuming that the SINR from the relay node is $\Gamma_R=10$ dB, then the sum capacity of the set G can be simply calculated by using equation 3 above:

$$C(G)=\{5.53, 3.87, 8.50, 5.56, 8.85, 8.53\} \quad (5)$$

The source node selecting algorithm based on maximization of the sum-capacity will select, in this example, the node group $G_5$ yielding a sum capacity of 8.85 b/s/Hz. Hence the selected node group in this example will give a maximum gain of almost 130% as compared to the "worst" case, i.e. group $G_2$, and a mean gain of 30%. The gain achieved by the present invention will become even more pronounced for a real communication system comprising more than N=4 source nodes that want to communicate with a same destination node, such as base station of a cellular radio-based communication system.

Figure 4:
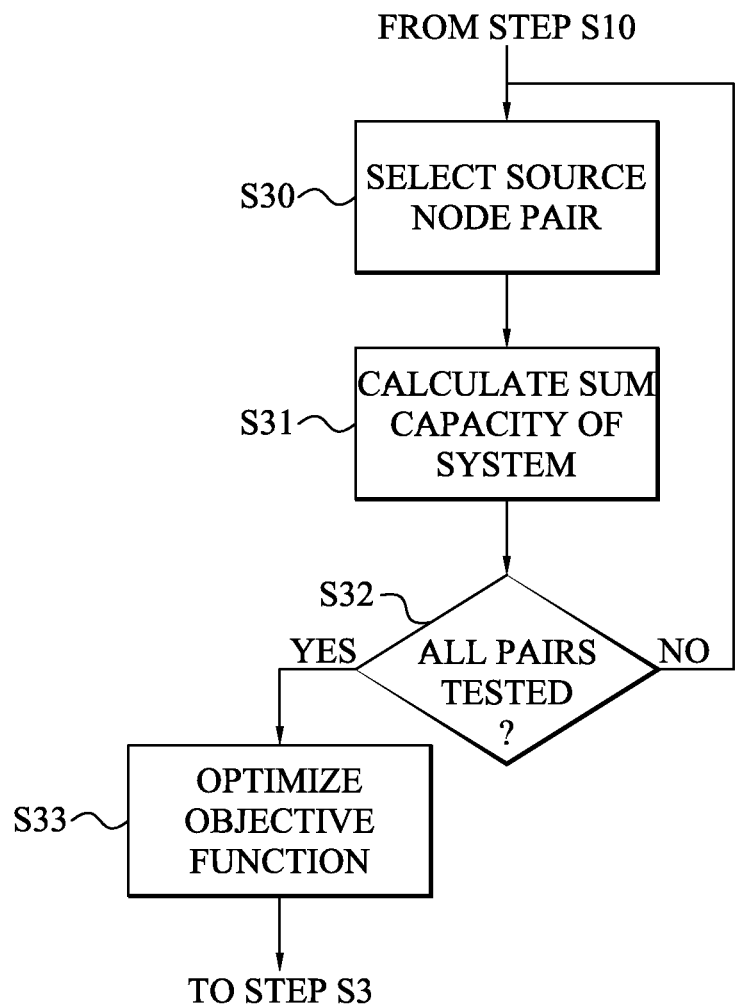
FIG. 4 is a flow diagram illustrating an embodiment of the node group selecting step of FIG. 1 in more detail.

FIG. 4 is a flow diagram schematically summarizing the operation of the selecting step in connection with optimization of an objective function. The method continues from step S10 of FIG. 2. A next step S30 selects a first candidate group or pair (M=2) of nodes among the N source nodes. A next step S31 calculates, based on the quality parameters estimated in step S10 of FIG. 2, the output of the objective function, such as the sum capacity of the system according to equation 3 above, for the selected node group. A next step S32 investigates whether all candidate groups have been tested. If not all groups have been tested, the method returns to step S30 where a new candidate node group is selected. As a consequence, the loop of steps S30 to S32 is performed once for each unique node group in the case of an exhaustive search. However, as was mentioned in the foregoing, sometimes the complexity of the optimization procedure can be reduced by omitting certain source nodes, for instance having SINR below $T_{SINR}$, having an experienced delay exceeding $T_{delay}$, having a data rate below $T_{rate}$, etc.

The method continues to step S33, where the objective function is optimized. This function optimization preferably involves identifying and selecting the candidate group that optimizes the function output, such as maximizes system capacity, minimizes delay, maximizes data rates, etc. The method thereafter continues to step S3, where data from the source nodes of the selected node group is network coded at the relay node to form combined network coded data.

The data communication method of the present invention can be implemented in any communication system employing network coding. As a consequence, the invention can be applied to both wired and wireless systems, where wireless radio-based systems and networks will in particular benefit from the invention. For instance, the invention can be applied to a peer-to-peer network having diverse connectivity between the nodes in the network, including unstructured and structured peer-to-peer networks. Other network types that benefit from the invention include multihop and ad hoc networks. In these types of networks, the user terminals or nodes are capable of operating as routers, repeaters or relay nodes for other terminals and nodes. Accordingly, data packets being sent from a source node to a destination node are typically routed through a number of intermediate nodes before reaching the destination. An ad hoc network is typically completely self-organizing in that the routing paths are not predetermined in any way. Multihop networks on the other hand may have some predetermined preferred hopping scheme, implying that a multihop networks is not necessarily an ad hoc network. A further example of a communication system is a relaying system, which is a conventional radio network complemented with relay nodes. These relay nodes communicate wirelessly with other network nodes, such as a base station, another relay node or a user terminal.

Figure 5:
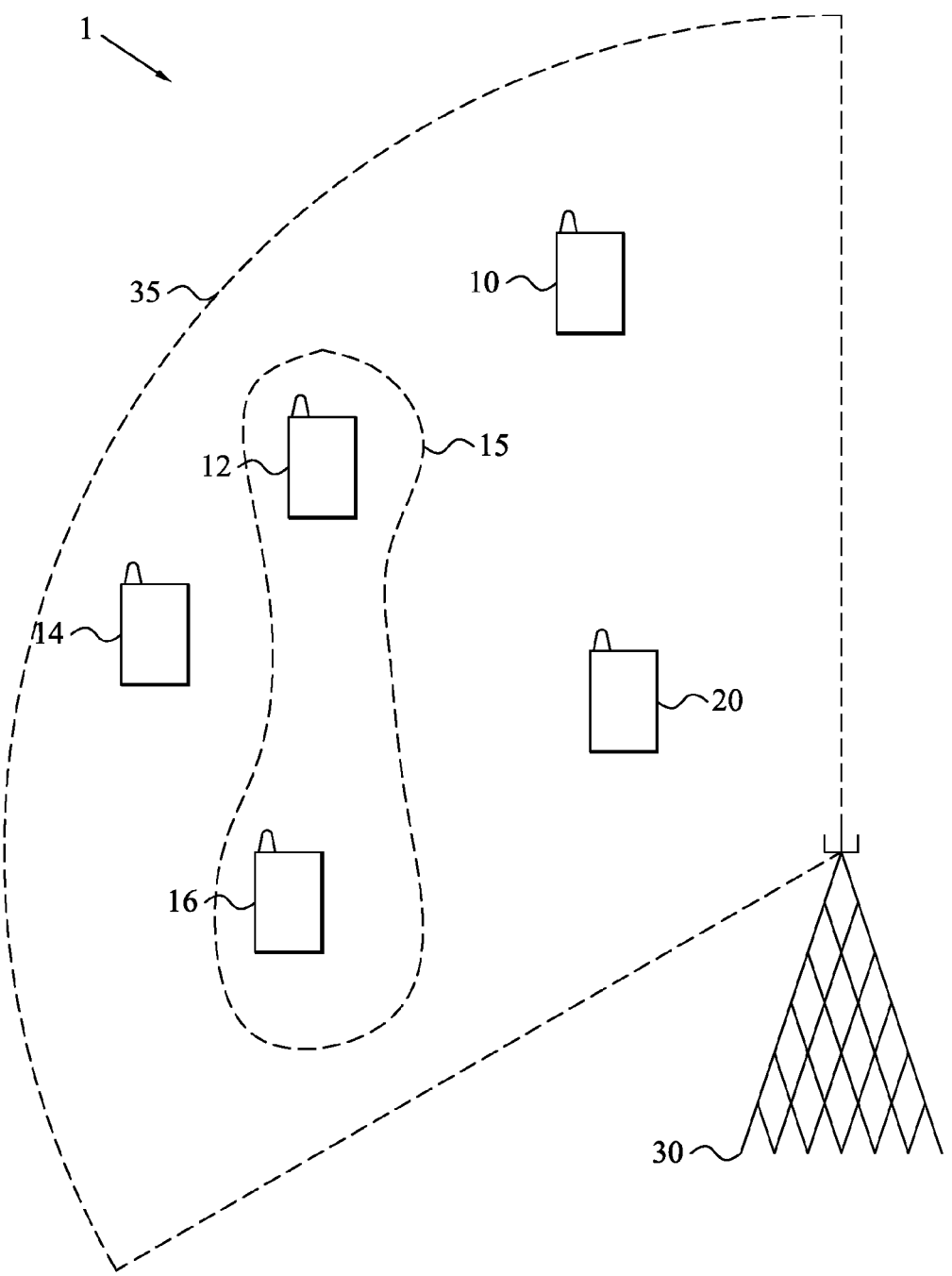
FIG. 5 is a schematic overview of a portion of a communication system, in which the present invention can be implemented.

FIG. 5 is an illustration of such a relaying communication system 1. The system 1 is based on a cellular approach, in which a base station or fixed network node 30 provides communication services in an associated communication area or cell 35. As a consequence, user terminals 10, 12, 14, 16, preferably mobile user terminals, such as mobile telephones, personal digital assistants or computers with wireless communication facilities, present in the cell 35 may wirelessly communicate with the base station 30.

The figure shows a relaying node 20 realized as a user terminal. This should, however, merely be seen as an illustrative example as other communication terminals and nodes, including mobile or fixed network nodes can operate as relay node 20 according to the invention.

FIG. 5 schematically illustrates the selection of a group 15 of source nodes 12, 16 among the available nodes 10, 12, 14, 16 present in the cell 35. The relay node 20 then performs network coding on data received from these grouped nodes 12, 16 and forwards the resulting combined data to the base station 30, which is also the destination node for that data.

FIG. 7 illustrates an example of a multihop or ad hoc system 1 having multiple network nodes 10, 12, 14, 16, 20, 30. In this example, four nodes 10, 12, 14, 16 are regarded as source nodes according to the invention as they have data to be transmitted to a destination node 30. A source node 20 performs network coding on received data from a selected group 15 of the source nodes 12, 16. The network coded data is then forwarded, possibly in one or more hops, to the intended destination node 30.

FIG. 8 is a schematic block diagram of a network coding control system 100 according to an embodiment of the present invention. The control system or unit 100 comprises a general input and output (I/O) unit 110 arranged for conducting communication with external units and nodes. The I/O unit 110 can be implemented in the form of a transmitter with connected transmitting antenna and a receiver with connected receiving antenna or a transceiver with a combined transmitting/receiving antenna. In such a case, the I/O unit 110 can wirelessly communicate with other terminals and units in the communication system. Another I/O unit implementation is in the form of a non-antenna based I/O unit capable of forwarding data to and receiving data from other units arranged in a same network node as the control system 100 and preferably wiredly connected thereto.

The I/O unit 110 is in particular adapted for receiving information of the N source nodes having data destined for a destination node and among which a subset of M source nodes should be selected by the control system 100. The I/O unit 110 is also arranged for communicating, to another unit arranged in the same network node or some other network coding node, information of the selected group of M source nodes.

The control system 100 comprises an identifier provider 120 arranged connected to the I/O unit 110. This provider 120 is adapted for providing information or identifiers of the N source nodes. The information provision is preferably performed by the provider 120 in the form of retrieving N identifiers, each being associated with one of the N source nodes. The identifier retrieval by the identifier provider 120 is preferably performed based on and among data received by the I/O unit 110 from another node-implemented unit or an external network node. For instance, a base station (destination node) contains a list of currently active mobile terminals (source nodes) communicating with the base station. Such a list or at least some of the information contained therein can then be forwarded to the I/O unit 110 and used by the identifier provider 120 for providing the N source node identifiers.

A source selector 130 is arranged in the control system 100 for selecting the group of M source nodes among the N source nodes. The selector 130 is, as is discussed further herein, preferably arranged for performing a purposeful, dynamic node group selection based on quality parameters and more preferably based on the optimization of an objective function.

The I/O unit 110 then functions as an identifier forwarder and forwards information or M identifiers of the group of M source nodes selected by the source selector 130. These M identifiers are forwarded from the control system 100 to the relay node that conducts the actual network coding on data from the source nodes. The relay node then utilizes the M identifiers to identify what data to combine to form network coded data to be transmitted to a destination node.

If the control system 100 is indeed implemented in the relay node, the I/O unit 110 simply forwards the M identifiers to the network coder or the data retrieving unit that identifies the relevant data from a data or receiver buffer. If the control system 100 instead is implemented in another network node than the relay node, the I/O unit 110 preferably comprises or is connected to a transmitter/transceiver with antenna equipment for transmitting the M identifiers to the relay node.

The network coding control system 100 preferably comprises a parameter provider 140 arranged for providing a respective communication quality parameter associated with the N multiple source nodes. The parameter provider 140 can be arranged for retrieving such parameter data from information received by the I/O unit 110 from an external unit or node. In such a case, the traditionally employed communication quality measuring and estimating functionalities of user terminals and base stations can perform the actual parameter estimation. Information of the estimated parameters is then forwarded to the I/O unit 110, allowing the connected parameter provider 140 to retrieve the parameter from the received information. In an alternative approach, the parameter provider 140 itself comprises parameter estimating functionality that determined the quality parameter based on measurements performed by a connected quality measuring unit.

As was indicated in the foregoing, the parameter provider 140 preferably provides link quality parameters as quality parameters. The link quality parameters are preferably representative of the quality of the communication links indicated in FIG. 6A, 6B or 6C.

The source selector 130 is then arranged for selecting the group of M source nodes based on the provided (link) quality parameters. In a preferred implementation, the source selector 130 uses the link quality parameters as input data of an objective function that has a relevant system quality parameter as output data, such as system sum capacity. In such a case, the selector 130 selects the source node group by optimizing the objective function comprising the input quality parameters. In a typical implementation, the source selector 130 investigates each candidate group or pair of M source nodes among the N available nodes. A respective quality parameter output is calculated by a connected calculator 150 for each candidate group. The selector 130 thereafter selects the candidate group that optimizes the objective function, i.e. preferably resulting in largest or smallest function output depending on the particular quality parameter employed.

The units 110 to 150 of the network coding control system 100 can be implemented in hardware, software or a combination of hardware and software. The control system 100 is advantageously implemented in the relay node and/or destination node according to the present invention. An alternative is to arrange the control system 100 in a source node or a fixed or mobile network node of the communication system. A distributed implementation is also possible with some of the units 110 to 150 of the network coding control system 100 arranged in different nodes of the communication system.

FIG. 9 is a schematic block diagram of an embodiment of a relay node 20 according to the present invention. The node 20 comprises a transmitter/receiver or transceiver 22 with connected antenna (system) for conducting communication with external nodes. The receiver 22 is in particular arranged for receiving data from source nodes, which data is intended to be brought to a destination node. The transmitter 22 of the relay node 20 transmits network coded data generated based on the node-originating data caught by the receiver 22.

The receiver 22 also receives information or identifiers of the N source nodes, either directly from the nodes, from the intended destination node or some other (control) network node in the communication system. These identifiers are fed into the network coding control system 100 previously described herein and implemented in the relay node 20 of this embodiment. The control system 100 performs the node group selection of the invention and outputs identifiers of the group of M source nodes selected. These identifiers are forwarded to a network coder 24 provided in the relay node 20 for network coding the data from the selected M source nodes. The data coding can be in the form of digital network coding or analog network coding as previously discussed.

In a preferred embodiment, the relay node 20 comprises a data or receiver buffer 26 temporarily storing data received from other units, including the source nodes. In such a case, the network coder 24 can operate on and (re-) encode data stored therein.

The resulting network coded data is transmitted by the transmitter 22 towards the destination node, either directly or in multiple hops utilizing other relay nodes in the communication system.

The units 22, 24 and 100 of the relay node 20 can be implemented in hardware, software or a combination of hardware and software.

FIG. 10 is an illustration of a schematic block diagram of another relay node 20 according to the present invention. In this case, the network coding control system of the invention is implemented in another, external nodes. As a consequence, M identifiers of the source nodes selected by that control system is forwarded to the relay node 20 and received by the receiver 22. The identifiers are fed to the network coder 24, which uses the identifiers for identifying what data to combine through network coding. The operation of this network coder 24 is similar to the embodiment disclosed in FIG. 9 and is not further described herein. The relay node 20 preferably comprises a data buffer 26 as previously discussed for temporarily storing the data received from the source nodes and that is to be network encoded by the coder 24.

The final (digital or analog) network coded data is then transmitted by the transmitter 22 to the destination node as discussed in the foregoing.

The units 22 and 24 of the relay node 20 can be implemented in hardware, software or a combination of hardware and software.

The relay node of the present invention and exemplified by the embodiments of FIGS. 9 and 10 can advantageously be a mobile wireless communication terminal if operating in a wireless radio-based communication system. As a consequence, the relay node can then operate in a multihop or ad hoc system. However, also stationary network nodes can operate as relay nodes according to the present invention, then communicating wirelessly or wiredly with other network nodes, including the destination node.

FIG. 11 is a schematic illustration of a block diagram of a destination node 30 according to the present invention. The destination node comprises a transmitter/receiver or transceiver 32 employed for communicating with external units, including the relay node and source nodes.

The destination node 30 comprises a network coding control system 100 according to the present invention for selecting a group of source nodes having data destined for the destination node 30. The control system 100 receives identifiers of these N source nodes from the receiver 32 or from some data store of the destination node 30.

In the former case, the destination node 30 can for instance contain a list of active source nodes present within its associated communication area (cell). Alternatively, the destination node 30 can store information of those source nodes present within communication distance and which has previously sent or tried to send data to the destination node 30. In such a case, the destination node 30 can have responded by returning acknowledgement (ACK) or non-acknowledgement (NACK) messages, well-known in the art. The destination node 30 can therefore store information of those source nodes to which it has sent such ACK/NACK messages during a preceding defined time period.

Alternatively, the receiver 32 provides the N identifiers to the control system 100, where the receiver 32 has received them from the source nodes themselves, the relay node or a control network node in the communication system.

The control system 100 outputs the M identifiers of the selected source nodes. These identifiers are sent to the relay node by the transmitter 32, where they are used for network coding data.

The receiver 32 also receives the resulting network coded data from the relay node 32, though possibly through multiple intermediate relay nodes. The combined data is either temporarily stored in a data buffer 36 until the destination node 30 has enough data to correctly decode the network encoded data. Alternatively, the data buffer 36 already contains previously received data from a subset of the selected M source nodes. In such a case, the decoder 34 can use this previously received data for decoding the combined data. This data decoding can be performed in one or multiple steps, depending on how many individual data (packets) that was combined by the relay node and how many individual data (packets) the destination node 30 has received and will receive. Generally, decoding combined data of M individual sources requires the usage of M−1 data (packets) from M−1 sources. The M−1 data is received by the receiver 32 from the source nodes, possibly in a multihop scenario and possibly in a network coded form.

For instance, assume that the destination node previously has received a data packet $b_1$ directly from a first source node. A relay node has also previously network coded data from a second and a third source node using the output from a network coding system of the invention. The resulting combined data $b_2 \oplus b_3$ has also been received by the destination node. At a later moment, a new network coded packet is generated by the relay node based on the data packets from the first and third source node. This combined data $b_1 \oplus b_3$ is sent to the destination node 30. The decoder 34 can then decode this last network coded data using the previously received first data packet to obtain the data from the third source node: $b_1 \otimes (b_1 \oplus b_3) = b_3$. Thereafter the decoder 34 uses the decoded third data packet $b_3$ to decode the previously received combined data $b_2 \oplus b_3$ to finally also obtain the data $b_2$ from the second source node.

The units 32, 34 and 100 of the destination node 30 can be implemented in hardware, software or a combination of hardware and software.

The destination node can advantageously be a network node of the communication system, such as a stationary base station of a wireless radio-based communication system. However, in an alternative implementation, the destination node is movable and can be a movable wireless communication terminal, including a user terminal.

It is anticipated by the present invention that the relay and destination nodes of FIGS. 9 to 11 typically includes further units and functions relating to the operation of these nodes. For instance, the nodes can include quality measuring units that estimate communication quality parameters, including link quality parameters, on data links and communication services that are currently active between the node and other nodes in the communication system. These other units and function are, however, well known to the person skilled in the art and are not illustrated in the drawings.

It will be understood by a person skilled in the art that various modifications and changes may be made to the present invention without departure from the scope thereof, which is defined by the appended claims.

The invention claimed is:

1. A data communication method in a communication system comprising N multiple source nodes each having data destined for a destination node, said method comprising:
defining a node number M where $2 \leq M < N$;
selecting a group of M multiple source nodes among said N multiple source nodes;
network coding, at a relay node of said communication system, the data from said group of M multiple source nodes to form network coded data; and
transmitting said network coded data from said relay node to said destination node;
wherein said defining comprises defining said group number M to be equal to two;
wherein said selecting comprises:
calculating, for each pair S(m,n) of source nodes among said N multiple source nodes, a sum capacity C(S(m, n)) of said communication system defined by:

$C(S(m,n)) = \log(1 + \max(\Gamma_m, \Gamma_n)) + \log(1 + \Gamma_R + \min(\Gamma_m, \Gamma_n))$ where $\Gamma_m$ is a communication quality parameter associated with a first source node of said pair of source nodes, $\Gamma_n$ is a communication quality parameter associated with a second source node of said pair of source nodes and $\Gamma_R$ is a communication quality parameter associated with said relay node; and
selecting the pair S* of source nodes that maximizes said sum capacity:

$$S^* = \operatorname*{argmax}_{S(m,n) \in S} C(S(m,n))$$

where S is a set of all possible pairs of source nodes among said N multiple source nodes.

2. The method according to claim 1, further comprising transmitting said data from said group of M multiple source nodes to said relay node.

3. The method according to claim 1, wherein said selecting comprises selecting said group of M multiple source nodes based on a respective communication quality parameter associated with said N multiple source nodes.

4. The method according to claim 3, further comprising estimating, for each source node of said N multiple source nodes, a respective link quality parameter associated with said source node, and wherein said selecting comprises selecting said group of M multiple source nodes based on said respective link quality parameters.

5. The method according to claim 4, wherein said estimating comprises estimating, for each source node of said N multiple source nodes, a link quality parameter representative of a link quality of a communication link between said source node and said destination node.

6. The method according to claim 4, wherein said estimating comprises:
estimating, for each source node of said N multiple source nodes, a link quality parameter representative of a link quality of a communication link between said source node and said relay node; and
estimating a link quality parameter representative of a link quality of a communication link between said relay node and said destination node; and
wherein said selecting comprises selecting said group of M multiple source nodes based on said link quality parameters representative of said link quality of said communication links between said source nodes and said relay node and said link quality parameter representative of said link quality of said communication link between said relay node and said destination node.

7. The method according to claim 3, wherein said selecting is performed based on optimization of an objective function that comprises said respective link quality parameters.

8. The method according to claim 7, wherein said selecting is performed based on maximization of sum capacity of said communication system.

9. A network coding control system comprising:
an identifier provider for providing N identifiers of N multiple source nodes, each having data destined for a destination node in a communication system;
a source selector for selecting a group of a predefined or determined group number M of multiple source nodes among said N multiple source nodes, where M=2, and N>2;
an identifier forwarder for forwarding M identifiers of said group of M multiple source nodes to a relay node for coding, using said selected M identifiers, the data from said group of M multiple source nodes to form network coded data to be transmitted to said destination node; and a calculator for calculating for each pair S(m,n) of source nodes among said N multiple source nodes a sum capacity C(S(m,n)) of said communication system defined by:

$$C(S(m,n))=\log(1+\max(\Gamma_m,\Gamma_n))+\log(1+\Gamma_R+\min(\Gamma_m,\Gamma_n))$$

where $\Gamma_m$ is a communication quality parameter associated with a first source node of said pair of source nodes, $\Gamma_n$ is a communication quality parameter associated with a second source node of said pair of source nodes and $\Gamma_R$ is a communication quality parameter associated with said relay node, wherein said source selector is arranged for selecting the pair S* of source nodes that maximizes said sum capacity:

$$S^* = \underset{S(m,n) \in S}{\mathrm{argmax}} C(S(m,n))$$

where S is a set of all possible pairs of source nodes among said N multiple source nodes.

10. The system according to claim 9, further comprising a parameter provider for providing a respective communication quality parameter associated with said N multiple source nodes, wherein said source selector is arranged for selecting said group of M multiple source nodes based on said respective communication quality parameters.

11. The system according to claim 10, wherein said parameter provider is arranged for providing a respective link quality parameter associated with said N multiple source nodes, wherein said source selector is arranged for selecting said group of M multiple source nodes based on said respective link quality parameters.

12. The system according to claim 11, wherein said parameter provider is arranged for providing, for each source node of said N multiple source nodes, a link quality parameter representative of a link quality of a communication link between said source node and said destination node.

13. The system according to claim 11, wherein said parameter provider is arranged for:
providing, for each source node of said N multiple source nodes, a link quality parameter representative of a link quality of a communication link between said source node and said relay node; and
providing a link quality parameter representative of a link quality of a communication link between said relay node and said destination node;
wherein said source selector is arranged for selecting said group of M multiple source nodes based on said link quality parameters representative of said link quality of said communication links between said source nodes and said relay node and said link quality parameter representative of said link quality of said communication link between said relay node and said destination node.

14. The system according to claim 11, wherein said source selector is arranged for selecting the group of M multiple source nodes that optimizes an objective function that comprises said respective link quality parameters.

15. The system according to claim 14, wherein said source selector is arranged for selecting the group of M multiple source nodes that maximizes a sum capacity of said communication system.

* * * * *